United States Patent [19]

Rixen et al.

[11] Patent Number: 4,991,516

[45] Date of Patent: Feb. 12, 1991

[54] TRANSPORT SYSTEM FOR WORKPIECES

[76] Inventors: Wolfgang Rixen; Gerrit Pies, both of Friedenstr. 107-109, 5650 Solingen, Fed. Rep. of Germany

[21] Appl. No.: 420,041

[22] Filed: Oct. 11, 1989

[30] Foreign Application Priority Data

Oct. 11, 1988 [DE] Fed. Rep. of Germany ....... 3834583

[51] Int. Cl.⁵ ...................... E01B 25/06; E01B 25/12
[52] U.S. Cl. ..................... 104/130; 104/139; 104/304; 104/305
[58] Field of Search ...................... 104/130, 139, 163; 105/29.1, 31, 99, 127, 165, 168, 169, 170; 213/220, 221; 293/2, 4, 102, 135, 136; 191/22 C, 22 DM, 23 R, 30, 39, 29; 410/116, 101, 106, 107, 124

[56] References Cited

U.S. PATENT DOCUMENTS

| 2,822,937 | 2/1958 | Fox | 293/2 |
|---|---|---|---|
| 3,461,250 | 5/1968 | Dehn | 191/23 R |
| 3,532,060 | 10/1970 | Brush | 104/139 |
| 3,772,482 | 11/1973 | Ross | 191/23 R |
| 3,885,655 | 5/1975 | Corl et al. | 191/29 |
| 3,906,866 | 9/1975 | Knipple | 104/139 |
| 4,043,436 | 8/1977 | Segar et al. | 191/22 C |
| 4,463,683 | 8/1974 | Uttscheid | 105/29.1 |
| 4,635,982 | 1/1987 | Feldmann et al. | 293/2 |
| 4,776,282 | 10/1988 | Ishikura et al. | 104/139 |
| 4,841,871 | 6/1989 | Leibowitz | 104/139 |

FOREIGN PATENT DOCUMENTS

| 0116021 | 8/1984 | European Pat. Off. . | |
|---|---|---|---|
| 2162738 | 6/1973 | Fed. Rep. of Germany . | |
| 3309377 | 9/1984 | Fed. Rep. of Germany . | |
| 594249 | 9/1925 | France | 105/29.1 |
| 8105040 | 9/1981 | France . | |
| 1354650 | 5/1974 | United Kingdom . | |

Primary Examiner—Robert P. Olszewski
Assistant Examiner—S. Joseph Morano
Attorney, Agent, or Firm—Herbert Dubno

[57] ABSTRACT

A transport system having a track made up of rail segments largely enclosing the self-propelled carriage which traverses the track. The track has no moving parts so that switching is effected by selectively bringing guide elements of the carriage into engagement with one or the other of branching rail segments.

18 Claims, 9 Drawing Sheets

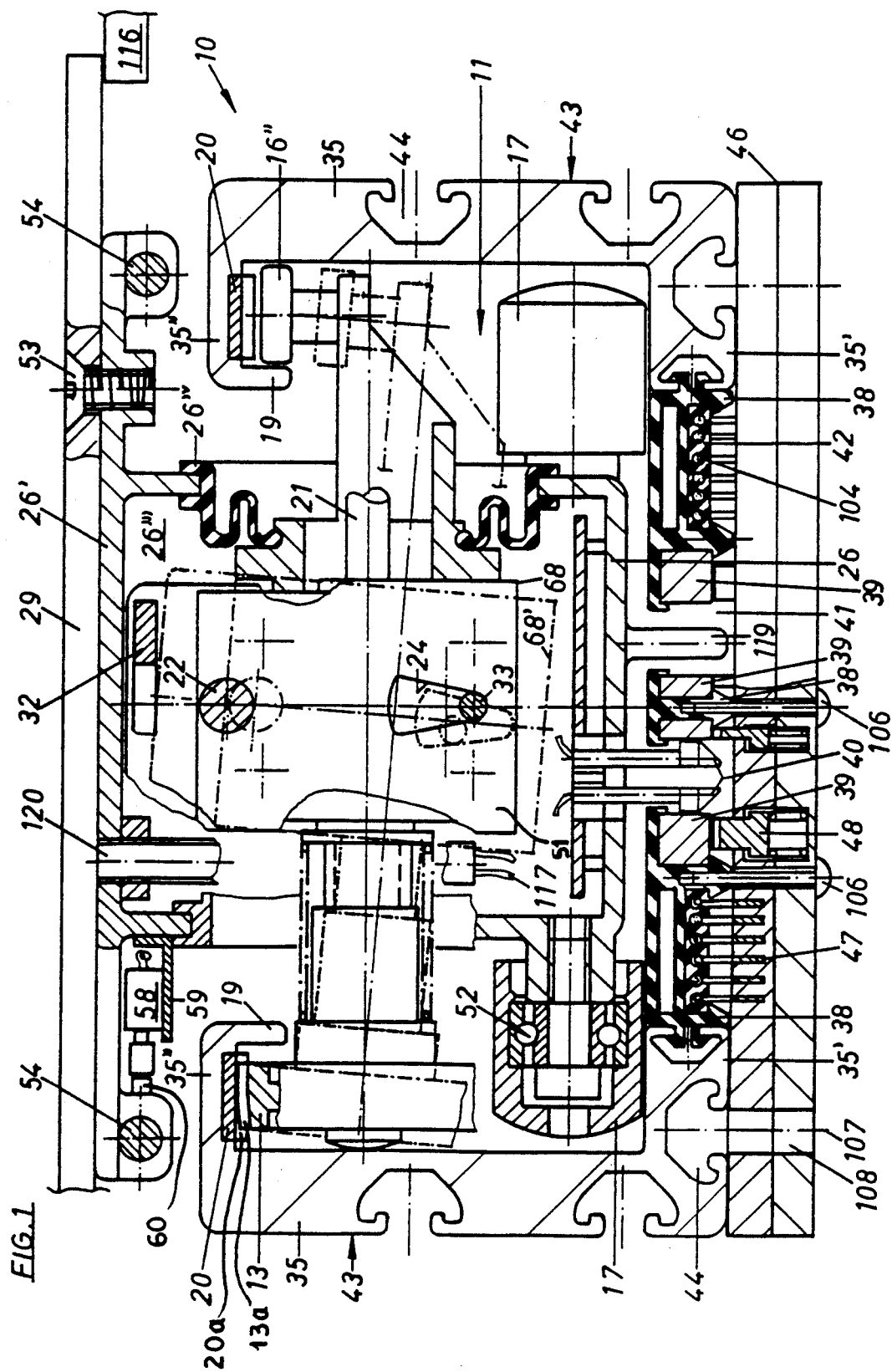

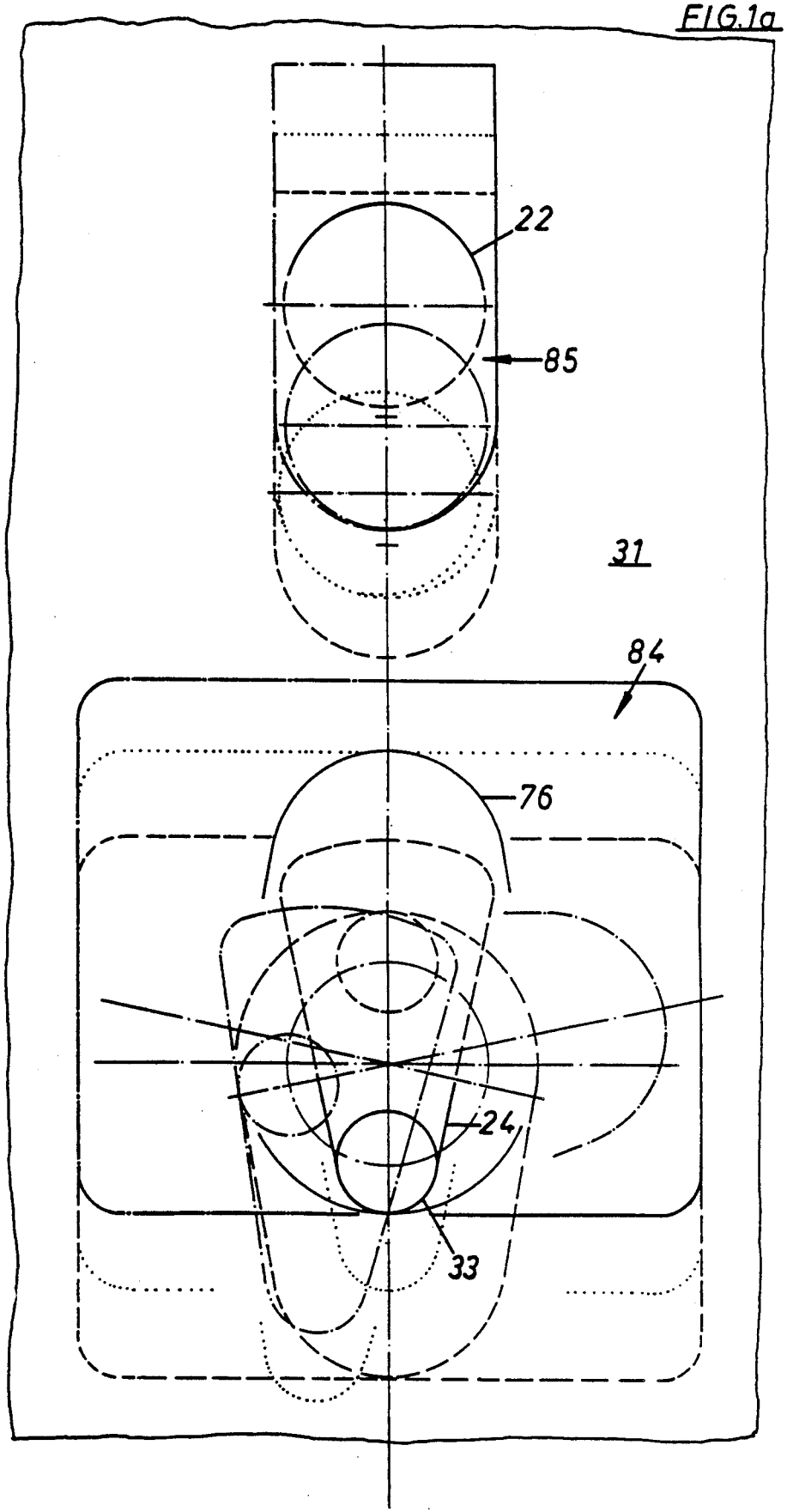

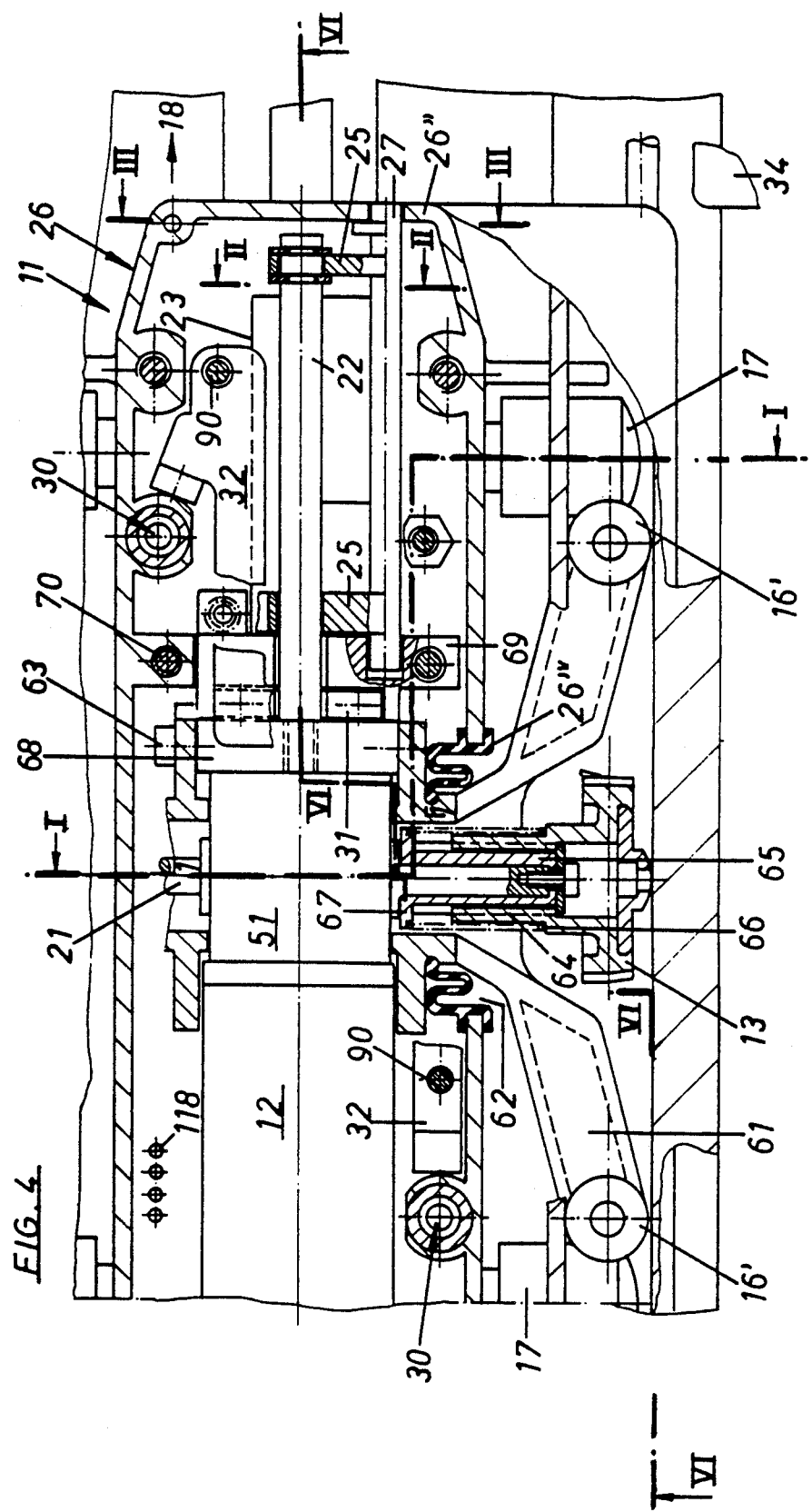

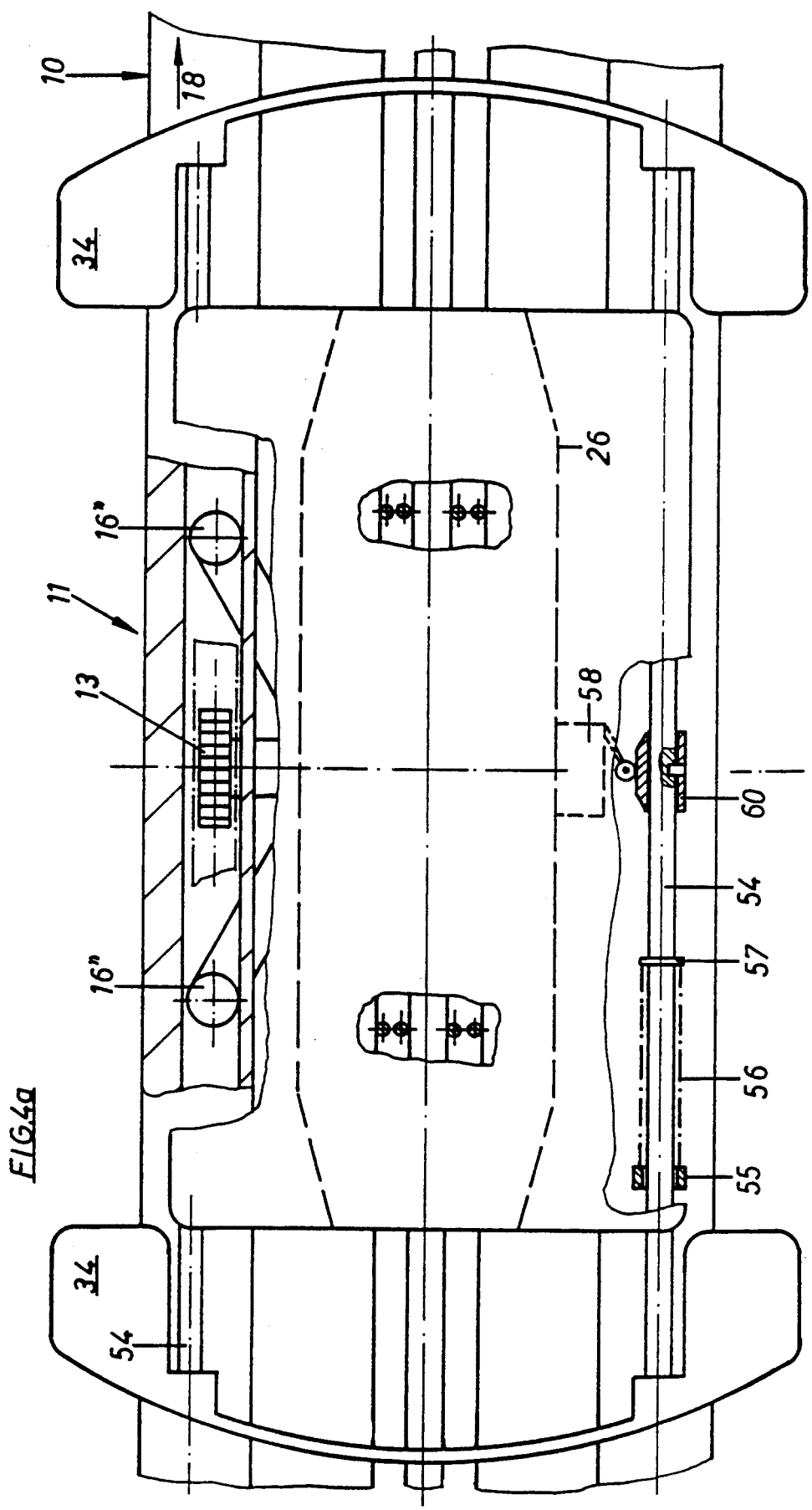

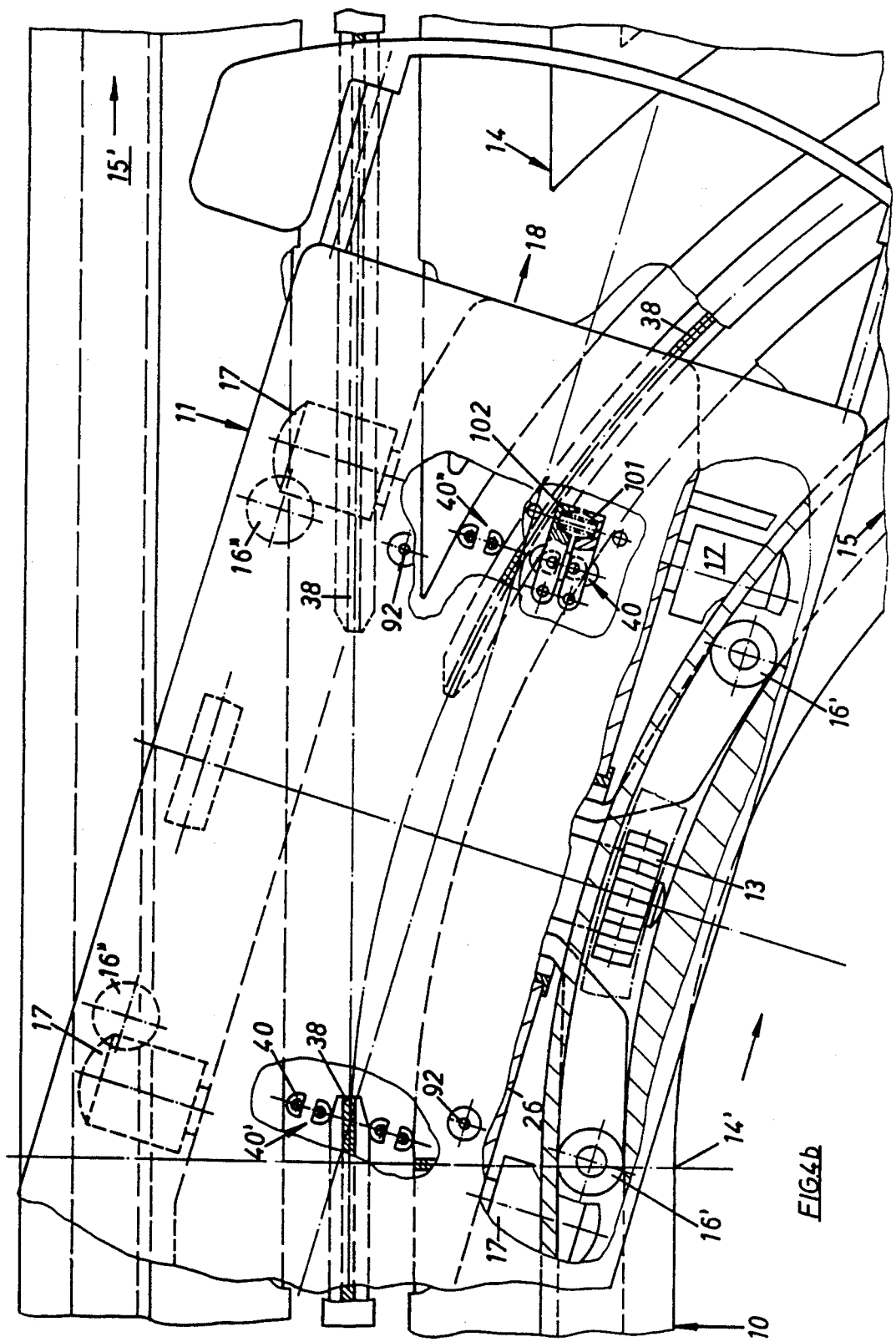

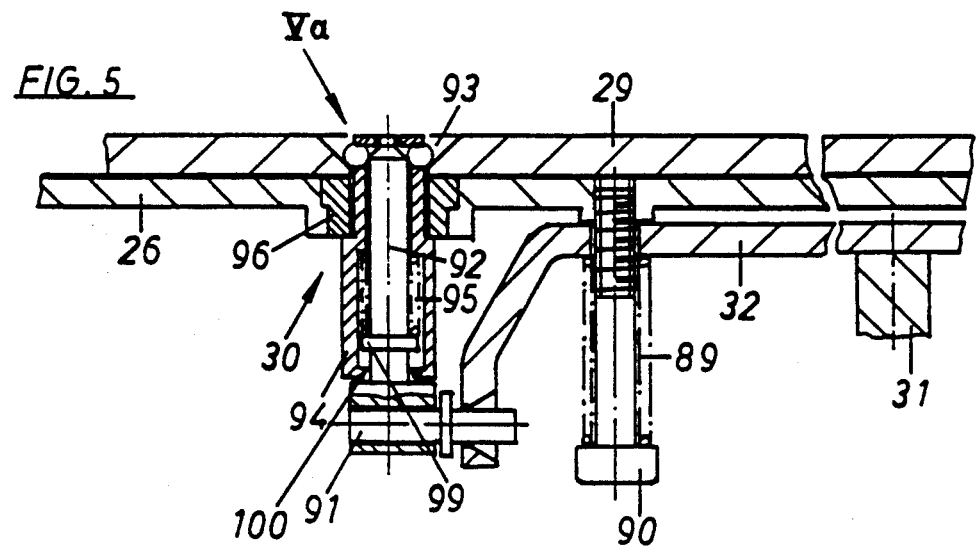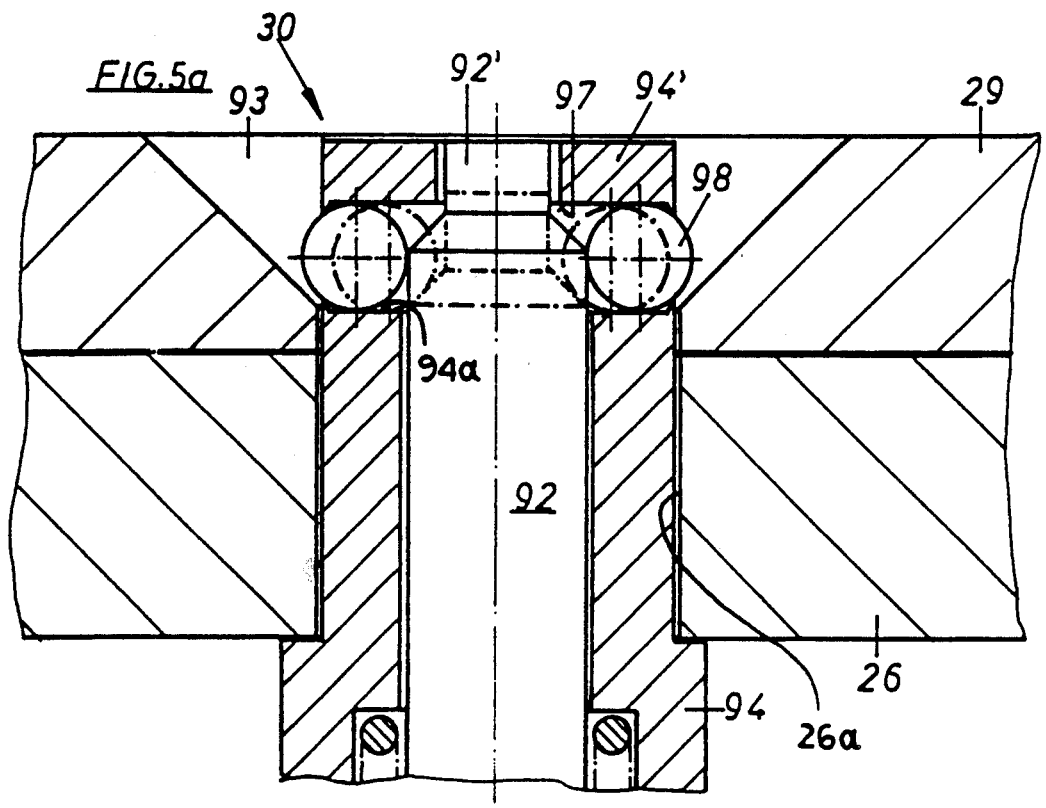

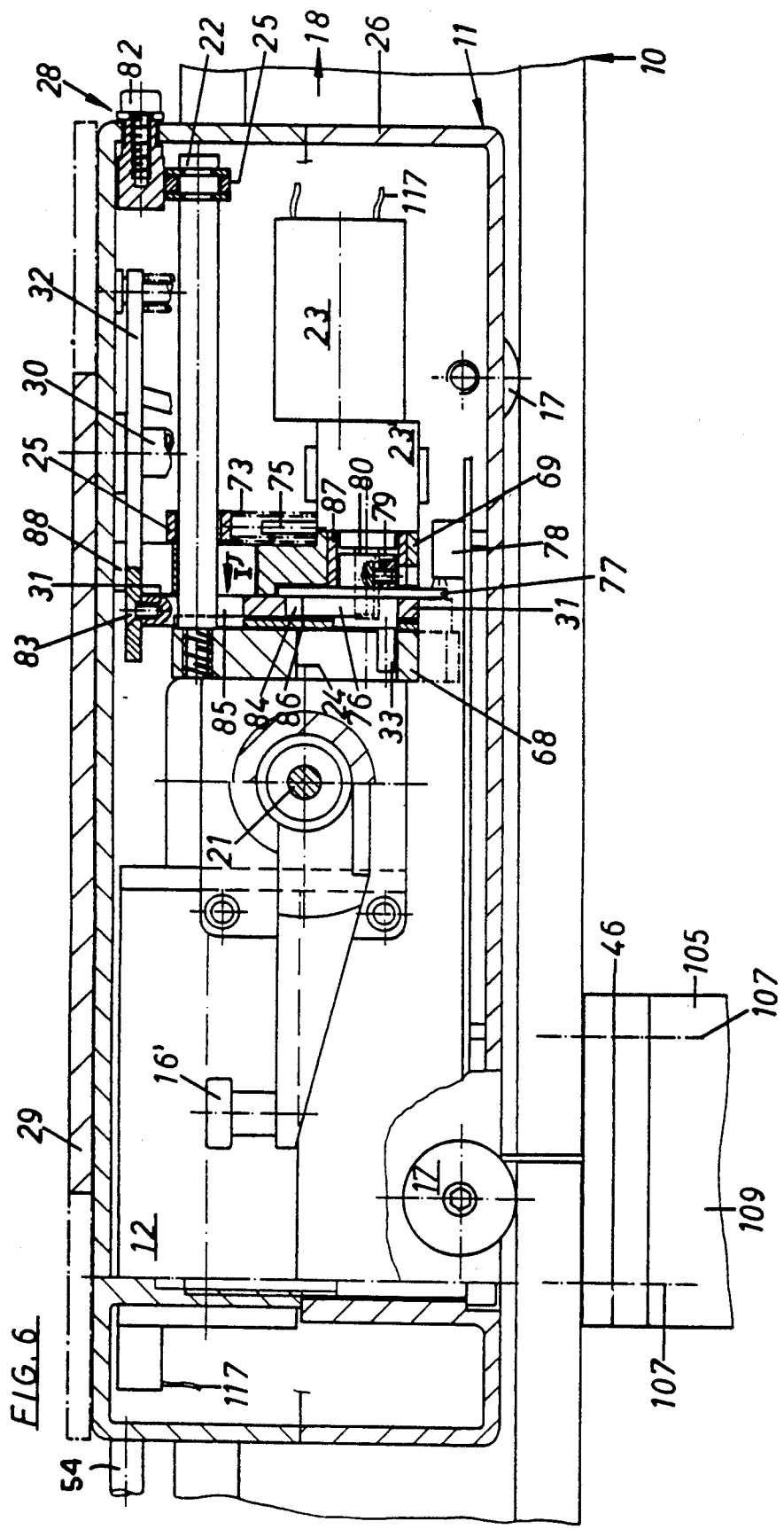

TRANSPORT SYSTEM FOR WORKPIECES

FIELD OF THE INVENTION

Our present invention relates to a transport system for workpieces and, more particularly, to a transport system of the type which comprises rails defining a track with branches for carriages guided along this track and having remotely-controlled drive motors for propelling the carriages on the track and in which the rails and carriages are in a form-engaging relationship for directing the carriages onto branches.

BACKGROUND OF THE INVENTION

Transport systems of the above-described type generally have carriages with controlled motors and a rail system provided with specialized mechanical elements which determine the path of the carriage along the track, i.e. whether the carriage will continue in a main direction or will be diverted to a branch.

For example, in such systems, the carriage may normally continue along the straight stretch in the vicinity of a branch unless and until a tongue of the branch is shifted to engage the carriage and divert it along the branch.

Rails with controllable elements of this type, however, have some basic disadvantages. For example, they are comparatively expensive to manufacture and maintain and also necessitate expensive control systems. It has been found, moreover, that such arrangements need frequent adjustment and monitoring and that the movable elements at the sites of the respective branch are susceptible to failure and require expensive controls to actuate them.

For example, such movable elements may have to be provided in heated spaces and thus may have to sustain constant heat loads which may be considerable and are detrimental to reliable operation. The same applies, of course, where the track must pass through an aggressive or corrosive atmosphere. In all such cases, special precautions have to be taken to ensure the reliability of trackswitching devices provided along the track and as part thereof.

OBJECTS OF THE INVENTION

It is, therefore, an object of this invention to provide an improved transport system of the type described in which the track can remain passive so that all elements and controls for switching the carriages onto a branch or from the main path of the track back onto the track can be accommodated on the carriage and so that the track itself need not have any controllable elements or even moving parts.

Another object of this invention is to provide an improved track system which obviates the drawbacks of earlier transport systems for carrying workpieces especially where the paths of the workpieces may include high thermal loading environments or corrosive and aggressive atmospheres.

SUMMARY OF THE INVENTION

These objects and others which will become apparent hereinafter are attained, in accordance with this invention, in a transport system in which at least in the regions of branches of the track, respective guide elements of a carriage can be selectively engaged with one or another of the longitudinally-extending rigid rail segments continuing along an original path of the track or diverging along a branch, so as to entrain the carriage along the respective selected rail segment to the exclusion of the other.

More specifically the transport system of the invention can comprise:
- a track defined by rails and including first rigid longitudinally extending rail segments continuing along an original path at a branch in the track and second rigid longitudinally extending rail segments diverging from the first segments at the branch; and
- a workpiece-carrying carriage mounted on the rails and displaceable along the track and comprising:
  - drive wheels on the carriage form-fittingly engaging the rails and propelling the carriage along the track,
  - a remotely controlled motor mounted on the carriage and operatively connected to the drive wheels for rotating same to propel the carriage along the track,
  - at least one guide element on the carriage shiftable in position selectively to engage and clear the first and second rigid rail segments, and
  - actuating means on the carriage for shifting the guide element to engage selectively in one of the rail segments and cause the carriage to continue along the path or to divert to the branch.

Advantageously two of the guide elements are provided on opposite sides of the carriage and are positioned for selective engagement in the respective rail segments, the actuating means including means for alternatively shifting the guide elements into engagement with the respective rail segment, a respective one of the drive wheels being disposed opposite one another on the opposite sides of the carriage, each of the drive wheels passing into engagement with a respective one of the rail segments corresponding to the guide element engaging same.

Preferably the rails have support portions and the carriage is supported on the rails by a plurality of running rollers journaled on the carriage and riding upon the support portions, the running rollers having axes transverse to a direction of displacement of the carriage on the track, the rails further having guide portions extending in the direction and the guide elements and drive rollers being spaced apart and vertically shiftable on the carriage selectively into engagement with the guide portions.

The carriage can have a generally rectangular plan configuration and is provided with two of the running rollers spaced apart along each of the sides, a pair of the guide elements spaced apart along each side with each guide element being located in a vicinity of a respective running roller a respective one of the drive rollers being located between the guide elements of each pair on the respective side of the carriage, each of the drive elements being shiftable transversely to the direction relative to the carriage.

In the latter case, the system can include:
- a common drive shaft on the carriage operatively connected to both the drive rollers and driven by the motor,
- means including a displacement shaft for mounting the motor and the drive shaft for displacement on the carriage to shift the drive rollers relative to the rails, and
- a servomotor on the carriage operatively connected to the displacement shaft for displacing same.

The guide elements are coupled with the respective drive roller for displacement with the motor and the common drive shaft, the carriage further comprising cam means between the servomotor and the displacement shaft for selectively in respective positions of the servomotor:

(a) shifting both pairs of guide elements and the respective drive rollers into engagement simultaneously with rail segments on opposite sides of the carriage;

(b) shifting one of the pairs of guide elements and the respective drive roller into engagement with one of the first and second rail segments while holding the other of the pairs of guide elements and the respective drive roller out of engagement with the other of the first and second rail segments;

(c) shifting the other of the pairs of guide elements and the respective drive roller into engagement with the one of the first and second rail segments while holding the one of the pairs of guide elements and the respective drive roller out of engagement with the one of the first and second rail segments; and (d) shifting both of the pairs of guide elements and the drive rollers out of engagement with the rail segments.

For the invention, therefore, it is important that the track include for each of the branch directions i.e. the directions along which the carriage can travel at each branch, a respective rail segment which is rigid (i.e. has no movable parts involved in the switching action) so that the guidance of the carriage in the respective branch direction is effected solely by selectively engaging one of these segments with a respective guide element of the carriage, e.g. a guide roller. The selection as to which branch direction is applicable is made by the control system in the carriage which includes a means for displacing a guide element selectively into one or the other of the rail segments. The carriage of the transport system, therefore, has all mechanical means on board for enabling the carriage to travel selectively along the different branch directions.

With a rail system as described which is passive, any error in direction selection is made by the carriage only. Should such a failure occur, production is generally not affected because the defective carriage can be rapidly replaced and a new carriage applied to the track rail system without any need to replace any part of the latter. It will be appreciated that, frequently when a track failure occurred, it was necessary to interrupt operations on the entire track until the defect was cleared up.

Furthermore, any repair of the carriage need not be effected while the latter is on the track or even in the plant provided with the transport system, since the carriage can be readily shipped to a repair facility without interfering with continued operation of the transport system.

The rail system can be provided for practically any performance and it can be used for transport systems in high heat loading environments, for systems having high production rates and thus can be fabricated with low per-piece cost.

A further advantage is that the carriage can be designed to satisfy requirements independently of those determining the throughput of the rail system since carriage interchangeability is possible and branching and transport rates can be exclusively a function of the carriages used.

Even outside the branch regions, the track may be constituted with rigid rail elements provided with means engageable selectively by the guide elements of the carriage and, for example, all of the guide elements and the drive wheels or rollers of the carriage can engage in the rigid guide elements even for straight line paths of the track. This is advantageous of course where high loads are to be carried or minimization of the specific loading of the drive elements themselves is desired. Furthermore, it is possible to omit rigid rail structures in those regions where straight-line travel is to occur without diversion.

The track itself can be constituted of one piece or multipartite-shaped members without any moving parts for directing the travel of the carriage in respective directions.

It has been found to be advantageous to provide the carriage with two oppositely disposed guide elements which can selectively be brought into and out of engagement with the respective rail segments and to provide each carriage with two oppositely disposed drive wheels which engage in a form-fitting meshing or engagement with the respective rigid rail elements.

In this case, the path is determined by which of the two guide elements is effective while the guide elements are provided in addition to the drive rollers or wheels and thus increase the number of parts, they have been found to be advantageous because they simplify the construction and use of the drive rollers or wheels since the latter do not have to direct the carriage along the respective path. The mechanical parts for switching over the direction can also be greatly simplified.

It has been found to be advantageous, for example, to provide each of the rail segments, at least in the region of a branch, with a vertically extending rib or flange which can be engaged by a vertical roller forming the guide element and to provide two such guide rollers in spaced-apart relationship with the drive roller or wheel between them.

Since the drive wheels are relieved from the lateral force requiring selection of direction, the drive rollers, the support rollers and the guide elements can be located in two mutually parallel vertical planes, can take up a minimum of space and can allow the space between them to be used for the drive motor and the other mechanical components of the carriage and for controlling the positions of the guide elements and the drive wheels.

In a particularly advantageous configuration, the carriage is supported on horizontal portions of the rails on four support rollers which are disposed on opposite sides of the rectangular plan configuration of the carriage or its housing and the guide rollers are disposed in the vicinity of the support rollers. The drive roller is located between guide rollers or support rollers. The drive rollers themselves can be axially shiftable between the guide rollers or the support rollers on the same side of the carriage to accommodate curvilinear travel of the carriage along the track.

According to a feature of the invention, the drive rollers have a common drive shaft rotatable by the drive motor and swingably connected therewith.

The drive motor, in turn, has a swingable and/or vertically movable mounting shaft extending in the direction of carriage travel and this shaft and the drive motor are displaceable, in turn, by a servomotor affixed to the carriage housing or chassis.

Since the drive motor forms with the drive shaft of the drive rollers a common adjustable unit, it can serve to displace this unit swingably transverse to the travel direction of the carriage and also vertically to control the engagement movements of the drive wheels and/or the guide elements which are coupled therewith as has been described. This affords an especially compact construction of the mechanism within the interior of the carriage.

The displacement of the drive motor by the servomotor is effected via mechanical elements that are referred to herein generally as a camming means.

This means can include a control sliding block whose shape determines the control movements of the drive wheels and guide elements with the rails on both sides or, selectively, on one or the other side and also allows a retraction of all drive wheels and guide elements from the rails. In the latter case, of course, the carriage can easily be removed from the track. The control sliding block of the cam means is an especially simple mechanical element enabling the engagement and disengagement of the drive wheels and guide elements.

Since the mounting shaft is also movable vertically, it can be connected to a rocker shaft having two spring-loaded rockers and is angularly displaceable in the carriage housing parallel to the mounting shaft.

A manual actuating device can be provided, therefore, to shift the position of the mounting shaft and thus cause the retraction of all of the drive wheels and guide elements from the rails. With this manual adjustment, it is possible, upon a failure, to enable the carriage to be removed from the track entirely, especially at a location substantially provided for this purpose.

It has been found to be especially advantageous to provide the carriage with a replaceable workpiece carrier and to provide a carrier locking device which is also actuated by the servomotor for locking the carrier to the carriage and releasing the carrier when replacement is required.

In that case, the carriage can have the same form regardless of the different shapes of workpieces to be transported since various carriers can be accommodated to the workpieces and all, insofar as their sides engaging the carriage, can be the same.

The use of workpiece carriers of this type also has the advantage that the workpiece can be mounted on the carrier with precision and thus will also be in a predetermined position on the carriage because the carrier itself is constructed so that it can only be transported and engaged and locked on the carriage in a predetermined position. It is important, therefore, that the carrier locking device be capable of precisely positioning the workpiece carrier and retaining that carrier in position during transport. Since the locking device is actuated by the servomotor which displaces the drive motor and serves for switching at branches of the track, no special drive is required for the locking device.

A comparatively simple construction of the mechanism for actuating a carrier locking device by the servomotor is ensured by providing a control plate which is displaceable by the servomotor and acts upon the locking device via a control lever.

Specifically the control plate can engage the control lever to bring the locking device out of engagement with the workpiece carrier against a spring force. A particularly reliable and space-saving configuration is obtained when the eccentric for the control plate is rigidly connected with a slide bolt serving for displacing the drive motor via the control slider.

To prevent an abrupt interruption of the movement of the carriage along the track should the carriage encounter an obstruction on the rails the system of the invention is provided with a pair of impact bars shiftable relative to the carriage housing and projecting beyond the latter at both ends thereof. At these ends the bars may be provided with appropriate bumpers. Spring means is provided between the carriage and the bars so that upon encountering an obstruction, the bars will be shifted relative to the carriage against a spring force. A switch can be provided which can reverse the motor or bring the motor to standstill when the relative displacement of the bars and the housing exceeds a predetermined amount.

It has been found to be advantageous to form the rails with downwardly open channels, an inner flank of which, relative to the track as a whole, is formed by the aforementioned rib or flange. The downwardly-turned surface of the channel can be formed with a vertically downwardly open-toothed form-fitting strip which can mesh with a correspondingly toothed periphery of the respective drive wheel or roller so that, as the drive roller is rotated, a positive form-fitting connection between the roller and the rail propels the carriage along the latter.

As a consequence, the carriage is driven in a slip-free manner relative to the rail so that its precise position can always be known to a central-control unit if the carriage is provided with a transmitter or sensor for outputting position-signals as well as direction-signals in terms of the tooth count of the drive wheel and its toothed strip. This allows precise carriage positioning from a central control station and, of course, precise determination from a remote location of the instantaneous carriage position. Position-monitoring systems of this type are well known where a nonslip drive is provided for a carriage.

We have found that best results are obtained when each of the rigid rails ss a C-section profile, at least in the branch region, the two C-section profiles opening toward one another and receiving the carriage housing between them.

Lower arms or shanks of the profile form supporting surfaces for the supporting rails while the upper shanks can be provided with the channels and guide ribs in the manner described, and, of course, the aforementioned drive strips for the drive wheels or rollers.

A rail system of this type encloses the carriage from below and on both sides in the sense of a reliable protective casing and shields the carriages against contact with objects which may move in the direction of the track.

This configuration of the rails also allows other advantages to be gained.

For example, between the lower transverse shanks of the profile, insulation profiles or bars can be mounted which can carry current-supply rails engaged by current-pickup shoes of the carriage.

The insulating profiles define practically a bottom for the rail system which can be continuous and flat on the side turned toward the carriage housing and can have vertically throughgoing slits through which the electric current-pickup shoes can extend from the carriage so that these shoes have a lateral access to the current-supply rails.

Any small part or objects which may be found within the rail, contaminants or the like, can pass through the slits and fall out of the enclosure constituted by the rail This is protected by the carriage movement. The insulation profiles, moreover can be provided with control conductors which extend parallel to the current-supply rails without requiring the cross sections of the rails to be modified to accommodate such control conductors.

It has been found to be advantageous to provide the confronting ends of the lower shanks of the C-section profile with longitudinally extending undercut grooves in which the insulation profiles can be fastened Such grooves can also be provided on all of the exterior sides of the profiles as well to enable the connection of other parts to the rail system, e.g. parts for supporting the rail system or parts which are supported thereby.

This system can be of especial significance when the rails are butted end to end and at their butt joints connecting plates are inserted in the fastening grooves and secure the rail segments together and can serve to provide terminals or contact connections for the current-supply rails and the control conductors. In this case, the connecting plates not only provide the electrical connection but in addition mechanically stabilize the rails. This stabilization can be sufficient that further bracing elements for the rails are superfluous.

The system can be simplified so that both C-shaped profiles at a particular branch diverge from one another in the branch region. In that case, it is possible to provide the C-shaped profiles only in the branch regions where a direction change may be required or a current rail reversal or switchover from one to another rail segment is necessary when the C-shaped rail segments diverge from one another, it will be appreciated that the current must nevertheless be supported on both sides and that the branches must also have support surfaces for the support rolls. A bottom or surface providing that support may be connected between all the profile members in the branch.

Outside the branch region, engagement with the drive rail need only occur along one side of the carriage so that the other side need not be provided with longitudinal guide and drive elements. It has been found to be advantageous to provide for each current-supply rail, two current-pickups which can bridge gaps in the current rail at branching locations and which are connected in parallel between another of the terminals of the motor. In that case, the carriage upon travel through a branch can maintain the electrical supply to the motor without interruption.

BRIEF DESCRIPTION OF THE DRAWING

The above and other objects, features and advantages of the present invention will become more readily apparent from the following description, reference being made to the accompanying drawing in which:

FIG. 1 is a cross-sectional view taken along the line I—I of FIG. 4 through a carriage and two rail segments forming the track according to the invention;

FIG. 1a is a detail view, greatly enlarged in scale and illustrating the region represented by the arrow Ia of FIG. 6;

FIG. 4 is a horizontal section through a carriage and rail substantially in the region of the carriage housing;

FIG. 4a is a partially broken away plan view of the carriage;

FIG. 4b is a partially broken away plan view of the carriage in the region of a rail branch;

FIG. 5 is a detail section of the workpiece carrier lock of the carriage;

FIG. 5a is a slightly modified enlarged showing of the detail Va of FIG. 5;

FIG. 6 is a vertical section through the carriage along a line VI—VI of FIG. 4.

SPECIFIC DESCRIPTION

Figure 2:
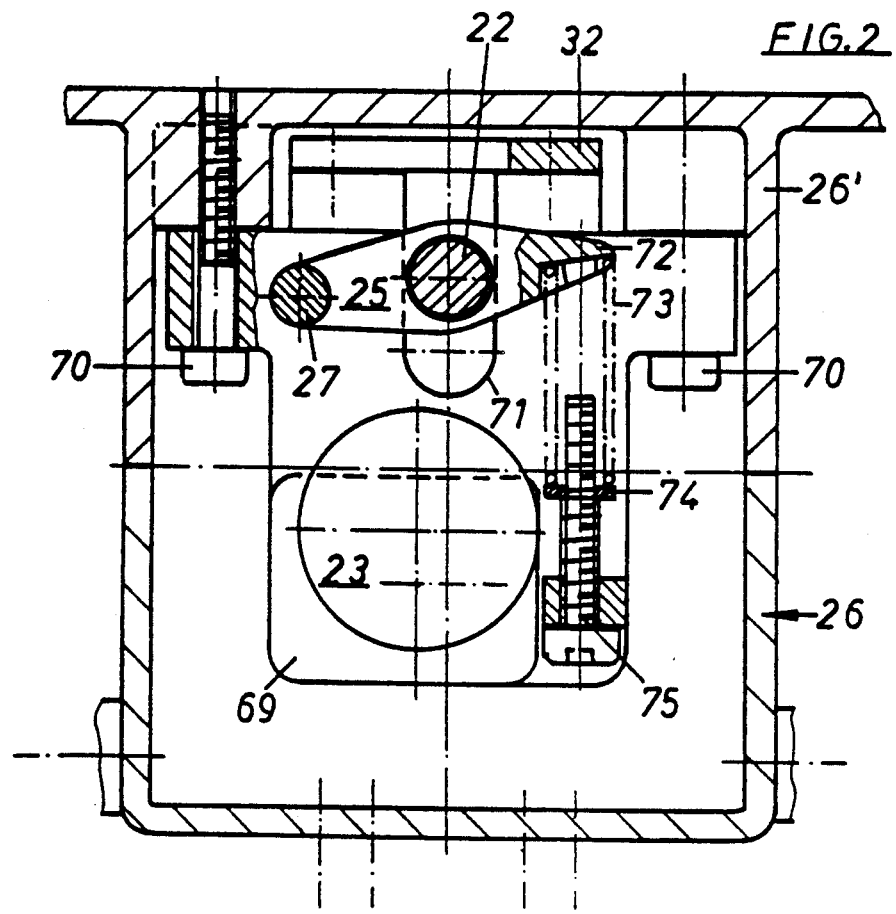
FIG. 2 is a section taken along the line II—II of FIG. 4.

The track 10, as shown in FIG. 1, is configured to enclose the bumper operating mechanisms of a carriage 11 and, to that end, can consist of two C-section profiles for rail segments 35 which open toward one another and are disposed at the same height so that their lower transverse shanks or legs 35' are mutually at the same levels, and lie opposite one another.

Between the lower legs 35', electrically insulating profiles 38 provided with current-carrying rails 39 are provided, the rail 39 being engaged by current-pickup shoes 40 of the carriage 11 constituting wipers delivering electrical energy to the carriage. A similar principle allows wipers to deliver command signals to the as well.

The electric energy powering the carriage 11 is supplied to an electric motor 12 (see FIG. 4) which applies its torque via a transmission 51 to a drive shaft 21 (FIG. 1) which extends transversely to the travel direction 18 of the carriage and is provided at its outer ends with drive rollers or wheels 13.

The drive wheels 13 have teeth 13a engaging in the teeth 20a of a form-fitting strip 20 affixed to the track 10 so that upon rotation of the drive shaft 21 the carriage 11 will be positively driven in the travel direction 18 or in the opposite direction depending upon the sense of rotation of the shaft 21. The drive is a positive drive in the sense that there is no slip between the drive rollers and the form-fitting strips 20 which are engaged thereby and fixed to the track.

The drive motor 12 is provided within a carriage housing 26 that is provided, in turn, with four support rollers or wheels 17 mounting the carriage on the rails 35 (FIG. 4b).

The rollers 17 are mounted on the housing 26 via roller bearings 52 (FIG. 1) and right on the lower transverse shanks 35' of the rails.

As will be apparent from FIGS. 4 and 6 the carriage 11 has a generally rectangular and preferably square configuration of the housing 26 and within this housing apart from the drive motor 12 and its transmission 51, all other drive and control parts of the carriage 11 can be received therein.

The carriage housing 26 practically fills the space between the C-section profile rails 35 and projects with an upper housing portion 26' (FIG. 1) upwardly above the upper arms 35' of the rails to support a workpiece carrier 29.

While preferably the workpiece carrier 29 is replaceably mounted on the housing portion 26' and is held there by a locking device which also accurately positions the workpiece carrier and can be released for replacement, e.g. with a workpiece, it is also possible to affix the workpiece carrier 29 so that it is not readily removable, e.g. by screws 53 as shown in FIG. 1.

The housing upper portion 26' has at its longitudinal sides above the track 10, slide bars 54 at the ends of which bumpers 34 (FIG. 4a) are provided.

The housing 26 (FIG. 4b) is braced via a spring 56 bearing upon a lug 55 of the housing, against an annular shoulder 57 of each bar 54.

In addition, a limit switch 58 (FIG. 1) is provided on the carriage housing 26 via an angle bracket 59 and can be actuated by a cam 60 affixed to the rod 54.

Thus should the carriage 11 via its right-hand bumper 54, while traveling in the direction of arrow 18 (FIG. 4a), engage an obstruction, this bumper 34 will be brought to standstill although the travel of the carriage housing 26 can continue in this direction until the limit switch 58 is actuated and brings the drive motor 12 to standstill or reverses this drive motor.

The spring 56 can take up any inertia of the carriage and serves to damp the stopping action.

Figure 7:
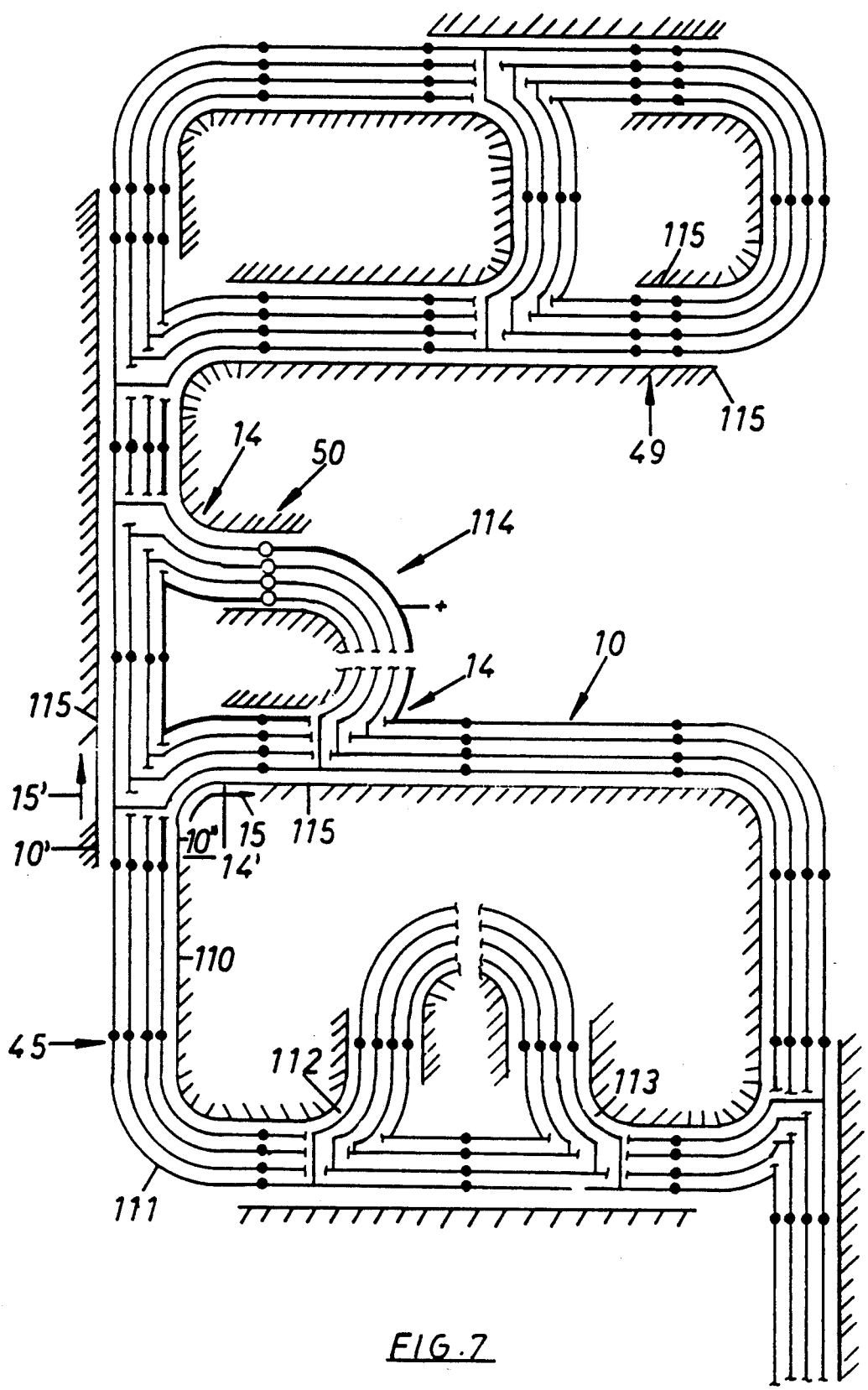
FIG. 7 is a rail plan for the track of the system.

In FIG. 7, we have shown a passive track system 10, i.e. a track system made up of rails without moving parts and thus free from any moving parts serving to switch the carriage 11 onto the various branches.

As a consequence, the carriage 11, which can be one of many carriages traveling over the track, is not only locomotive but also capable of automatically selecting the path it will take solely by the control of moving parts within the carriage. Although a locomotive carriage has been illustrated alone, it will be understood that it can draw other noncontrollable and nonlocomotive carriages if desired.

To allow the carriages to select the travel direction at a branch 14, the rails in straight-travel portions of the track and at the branch must be provided in a configuration enabling engagement of the rails by guide elements 16' or 16" on the carriage.

To illustrate the invention, branches have been shown at 14 and, at least in the branching regions 14' (FIG. 4b), each of the travel directions 15 and 15' will include a rigid rail segment 10' or 11' and the carriage will have a respective guide element or roller 16' or 16" that can selectively engage in one or the other of these roll segments 10' or 10".

Depending upon which of the guide elements 16' or 16" is rendered effective, it engages the rail segment 10' or 10" and causes the carriage 11 to travel in the direction 15 or 15' as illustrated in FIG. 4b.

While it is conceivable to provide the guide element simultaneously as the means for propelling the carriage, we have found it to be advantageous to separate the guide elements 16' and 16" and the drive wheels 13. This has been found to be particularly advantageous because it increases the precision of guidance of the carriage in curve and branch regions of the track as, for example at 14 even under substantial load.

Because the curvilinear travel can be effected precisely, the data pickup by the shoes 40 from the rails 39 can be effected with precision as well and data loss can be minimized. Continuity of current pickup can likewise be ensured.

Best results with respect to the precision of curvilinear travel are obtained, in accordance with the invention, when the carriage 11 has a pair of such guide elements 16' or 16" on each side of the carriage and, more specifically, in the direct vicinity of the support rollers 17, e.g. disposed vertically above the support rollers as will be apparent at the right-hand side of FIG. 1.

Each pair of guide elements 16' and 16", as can be seen from FIG. 4, is mounted upon a respective support arm 61 passing through a housing opening 62 and attached within the housing to the drive motor 12 or its transmission 51 by a flange connection. As can be seen from FIG. 4, this connection can be effected at bolt or screw locations 63.

The interior space 26''' of the housing, containing both the drive motor 12 and a servomotor 23, can be hermetically sealed against the exterior. To this end, there are in the regions of the drive shaft 21 and the flanges of the support arm 61, respective elastic bellows or sleeve seals 26$^{iv}$.

As shown in FIG. 4b, substantially midway between each pair of support rollers 17 or guide elements 16', 16" on a respective side of the carriage the respective drive wheel 13 is disposed. As noted, the drive wheels 13 are toothed and mesh with the form-fitting drive elements or racks 20 which may be formed as strips of a timing or cog belt or the like affixed in grooves on the underside of the upper transverse shank 35" and thus protected from contamination and contact.

The drive wheels 13, moreover although keyed to the shaft 21, are axially displaceable along this shaft.

After a branch region 14' is encountered and the respective guide elements are displaced to engage the rail segment in this branch region, only one of the two drive wheels 13 will mesh with the respective form-fitting drive element 20 of the rail. The other drive wheel 13, to prevent undesired change in the position of the carriage, can be lowered to clear its drive element 20.

For straight travel, of course, both drive wheels can engage the respective racks, although this is not essential.

Finally, both drive wheels may be lowered together from the respective racks when the carriage is to be removed from the rails. The guide elements 16' and 16" must be moved correspondingly.

For this purpose, a movably mounted assembly is provided by the drive motor 12 and transmission 51 and is mounted on a mounting shaft 22 to enable the movement relative to the carriage housing 26.

As can be seen from FIG. 1, the mounting shaft 22 allows vertical movement as well as the tilting or angular movement for switching paths of the carriage. By a combination of these movements, all of the required positions of the drive wheels 13 and guide rollers 16' and 16" can be reached.

From FIG. 4b it can be seen, by comparison with FIG. 4a, that the drive wheel 13 during curvilinear travel does not remain coplanar with the two guide elements 16' on the respective side of the carriage, i.e. shifts out of line connecting the axes of the guide elements 16' inwardly.

This is permitted by the axial shiftability of the drive wheels 13 transverse to the carriage travel direction 18 as will be apparent from the construction of the wheels illustrated in FIG. 4.

For this purpose, each wheel 13 comprises a coupling sleeve 16 on the drive motor side which is internally toothed or splined and is longitudinally shiftable upon an axially nonshiftable entrainment sleeve 65 which has an external toothing or spline set.

The sleeve 65 is connected by a screw fixedly with the drive shaft 21 and is thus angularly entrained therewith. The drive wheel 13 is braced by a spring 66 outwardly, this spring being seated on a driven flange 67 of the sleeve 65 so that after the carriage has negotiated the curve or branch as shown in FIG. 4b, the drive wheel 13 returns to its normal position as shown in FIG. 4, wherein it is essentially coplanar with the guide rollers 16'.

FIG. 1 shows in solid lines a horizontal position of the drive shaft which is the uppermost position of the drive motor 12 and corresponds to the position in which both drive wheels 13 engage in respective racks 20 along the opposite rails 35 and in the respective transverse shanks 35". In this position, the guide element 16' can lie inwardly of the guide ribs or flanges 19 which extend vertically downwardly form the upper arms 35" of the rail elements. The guide elements 16' and 16" are, for example, guide rollers mounted on ball bearings.

The assembly can assume a dot-dash position as shown in FIG. 1 as well upon angular displacement of the mounting shaft 22 and a lowering thereof. In this position, the left-hand drive wheel 13 meshes with the respective rack 20 and the two guide elements are guided by the flange or rib 19 of the left-hand rail segment 35.

On the opposite side of the carriage, the guide elements 16" are lowered out of engagement with the respective flange or rib 19 and, similarly, the drive roller 13 on the right-hand side is lowered out of engagement with its rack. In this case, the carriage would be guided along a left-hand branch.

Conversely, a tilting of the assembly in the counterclockwise sense would disengage the drive roller 13 and the guide elements at the left-hand side and engage the drive roller and guide elements at the right-hand side to permit travel along a right-hand branch. Thus for travel along the rail segment 15 as shown in FIG. 4b, the guide rollers 16" and the drive wheel 13 between them would be raised on the guide rollers 16" and the respective drive wheel would be lowered.

The mounting of the shaft 22 to the drive motor 12 is effected via head plate 68 best seen in FIGS. 4 and 6. This head plate is fastened on the stepped-down transmission 51 and has the mounting shaft 22 screwed into it. The mounting shaft 22, in turn, is held in a pair of rockers 25 of a rocker arm 27 which is angularly displaceable in the housing and has one end mounted in an end wall 26" of the housing 26. The rocker shaft 27 is also angularly displaceable in a bearing block 69 which is attached by bolts 70 to the upper part 26' of the two-part housing 26 (see FIG. 2).

The journal block 69 has a cutout 71 of a depth corresponding to the vertical mobility requirement of the mounting shaft 22.

The motor side rocker 25 has its end 72 opposite the rocker shaft 27 braced against a spring 73 whose other end is braced against the compression ring 74 of a compression screw 75 permitting adjustment of the spring force acting upon the rockers 25. This spring force must be overcome when the mounting shaft 22 is to be moved.

The maximum possible swing of the rockers 25 is determined by the stroke of the mounting shaft 22 until it comes to rest on the bottom of the bearing block cutout 71.

To move the drive motor 12, the head plate 68 is provided with a slide opening 24 forming part of a camming means and whose precise form can be seen from FIG. 1. A slide pin 33 driven by a servomotor 23 engages in the slide 24. This pin is rigid with an eccentric 76 for a control plate 31. On the servomotor side, the eccentric 76 has a disk 77 which cooperates with a position sensor 78 signaling the position of the eccentric 76 and hence of the pin 33. This signal may be transmitted to a central station and can be used in accordance with conventional remote control techniques to control the carriage via, of course, the signal conductors provided on the track.

The screw connection 79 seen in FIG. 6 connects the eccentric 76 with a drive shaft 80 shown in broken lines, from the speedreducing transmission 23' of the servomotor 23.

At the housing side rocker 25, a manual operating or positioning device 28 is provided to shift the mounting shaft 22. This device 28 is best seen in FIGS. 3 and 6.

Figure 3:
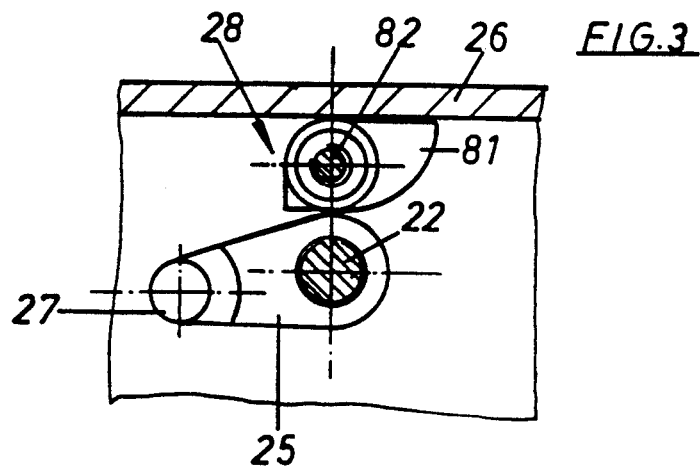
FIG. 3 is a section taken along the line III—III of FIG. 4.

For example, from FIG. 3 it is possible to see the horizontal position of an eccentric cam 81 of the manual operating device. If the adjusting screw 82 of the device 28 is rotated in the clockwise sense, the mounting shaft 22 is moved downwardly. By rotation of the slide pin 33 in the clockwise sense in FIG. 1, the head plate 68 with its slide 24 can be brought into the dot-dash line position 68'. With compression of the spring 73, the shaft 22 can bring the assembly into its lowered right-hand position illustrated in FIG. 1 in which the guide elements 16' are brought out of engagement. By a shifting of the pin 33 in the counterclockwise sense, the head plate 68 is swung in the counterclockwise sense so that the left-hand wheel 13 is lowered while the guide element 16' at the right-hand side of FIG. 1 is raised.

In the illustrated middle position of the pins 33, both drive wheels 13 and pairs of guide wheels 16', 16" engage the respective rails. It is thus possible to switch over the drive wheels and guide elements to engage one side or the other side of the track to enable the carriage to select one or another branch without any moving part on the track.

The engagement of the control plate 31 with the eccentric 76 serves to control a locking mechanism 30 for the workpiece carrier 29 when the latter is not affixed to the housing by the screws 53.

In that case the control plate 31 is fastened by a screw 83 on a control lever 32 of the locking device 30 shown in greater detail in FIG. 5.

The control plate 31 has a cutout 84 for the eccentric 76 and a longitudinal slot 85 in which the mounting shaft 22 can move forwardly.

The control plate 31 is fastened between the bearing block 69 and a cover plate 86 which has a bearing sleeve 87 for rotatably mounting the eccentric 76 with disk 77 and pin 33.

In addition, the bearing block 68 has in the region of movement of the control lever 32 a vertical cutout 88 which permits vertical movement of the control lever 32 unhindered by the bearing block 68.

A vertical bracing of the control lever 32 which extends from the region of the housing end 26' along the one side of the carriage to the region of the opposite side of the carriage is effected by means of springs 89 on vertical bolts 90 anchored in the housing 26. The springs 89 press the control lever 32 upwardly against the upper half 26' of the housing so that the lever entrains transverse pin 91 and the locking pin 92 coupled therewith upwardly.

The upward movement of the pin 92 causes it to displace a pair of locking balls 98, which are received in recesses 94a in a sleeve 94, outwardly.

The sleeve 94 engages in the recesses 93 of the workpiece-carrying plate 29 so that the balls, when displaced outwardly, engage the workpiece-carrying plate and retain it on a housing 26, the plate 29 being positioned on the housing by the sleeves 94 of the locking devices 30 of which a plurality can be provided, if desired, all controlled by the lever 32.

As is also apparent from FIG. 5, the pin 92 is vertically displaced within the sleeve 94 against the force of a spring 95 acting downwardly and the force of which is overcome by the force of the spring 89 so that the pin 92 is held in its upper position.

The sleeve 94 is likewise maintained in its upper position by the force of springs 89 until the lever 32 is drawn downwardly by the servomotor.

The upper end of the sleeve 94, which can move vertically in an opening 26a of the housing 26, is interrupted to provide the recesses 94a accommodating the balls 98 and these recesses can have guide walls 97 for the balls.

The end of the sleeve 94 which can extend upwardly into the plate 29 is represented at 94'.

The end 92' of the pin 92 is stepped to define a small-diameter portion allowing retraction of the balls 9 into the dot-dash line position when the pin 92 is lowered.

The balls 98 prevent a lifting of the workpiece carrier 29 from the housing 26 and thus from the carriage 11. When the balls are retracted, however, the carrier 29 can be lifted off. That is commonly the case should the carriage fail and it is necessary to remove the carriage from the track.

Upon retraction of the ball and lowering of the sleeve 94, the plate 29 can be shifted with a workpiece thereon horizontally into an appropriate work station. The downward movement is effected by a corresponding engagement of the control plate 31 by the mounting shaft 32, the latter being moved downwardly by actuation of the manual device 28 so that it reaches the lowest position in the slit 85 and thus can move the control plate 31 several millimeters downwardly.

In that case, the annular shoulder 99 of pin 92 does not yet come to abut the annular collar 100 of the sleeve 94 or the latter remains, as before, in the recess 93 of the workpiece carrier 29.

The locking parts 92 and 98 have, however, their dot-dash line positions in which they are set by the hand-operated mechanism and both wheels 13 and guide elements 16' and 16" are effective to drive the carriage.

A further shifting of the pin 92 downwardly results in a retraction of the sleeve 94 entirely out of the recess and is only possible when the control lever 32 is correspondingly displaced by the control plate 31, this is possible only via the eccentric 76 when the latter is driven by the servomotor 23. In this case, the control plate 31 is moved to its lowest position and pulls the pin 92 and the sleeve 94 completely from the recess 93 via the control lever 32.

To clarify the control of the drive wheels 13 and the guide elements 16' and 16", and to further explain the operation of the locking device 30 for the carrier plate, reference may be had to FIG 1a which is substantially a view in the direction of the arrow I of FIG. 6 of the control plate 31 and which shows clearly the eccentric cutout 84 and the mounting shaft slit 85.

In the latter, the different positions of the mounting shaft 22 are shown while the recess 84 has been illustrated with respect to the positions of the eccentric 76 and the control slide 24.

In its normal position, i.e. a position in which it is not influenced by the eccentric 76 and the mounting shaft 22, the cutout 84 and the slit 85 as well as the eccentric 76, the pin 33 and the mounting shaft 22 are in their continuous line positions. In these positions, both of the drive wheels 13 and both of pairs of guide elements 16' and 16" on both sides of the carriage are in engagement with the respective elements of the upper arm 35" of the rail segments 35 and the continuous drive of the carriage is effected along the track.

If pin 33 is rotated by the servomotor 23 in the clockwise sense as seen with respect to FIG. 1a, it assumes its dot-dash line position. As a result, the head plate 68 is shifted into the dot-dash line position 68' shown in FIG. 1.

The control slide 24 has a dot-dash line position shown in FIG. 1a. A corresponding displacement of the eccentric 76 rigid with this pin 33 is seen by the dot-dash position of the eccentric 76 at the lower part of FIG. 1a, which, however, does not influence the control plate 31 since the cutout 84 is sufficiently large as to prevent such an influence.

Consequently, the position of the control plate 31 remains unaltered as can be seen in dot-dash lines since the lowering of the mounting shaft 22 into its dot-dash position in FIGS. 1 and 1a does not give rise to an engagement of the control plate 31. As a consequence, the locking device 30 is not actuated and only the guide element 16" on the left-hand side with respect to the travel direction 18 and the associated drive wheel 13 are drawn out of engagement with the respective rail so that the carriage 11 can pass along a right-hand curve at a branch to the right, i.e. can travel in the clockwise sense.

A corresponding control for left-hand travel can be effected to permit travel in the counterclockwise sense and involves the movement of the pin 33 into a position not shown in FIG. 1a but is mirror symmetrical with respect to a vertical symmetry axis from the position shown in dot-dash lines for the pin 33 and involves the retraction of the guide element 16' and the associated drive wheel 13 from engagement with the rails.

A further position into which the mechanism can be brought is the emptying position in which an unloading of a workpiece and the associated workpiece carrier from the carriage 11 is effected by a horizontal relative movement of the carrier and the carriage. For this, the pin 92 and the sleeve 94 must be pulled completely downwardly out of the recess 23 and is effected by a rotation of the eccentric 76 with the servomotor 23.

The control plate 31 (FIG. 1a) is then drawn downwardly to its lowest broken-line position which is not hindered by the position of the mounting shaft 22 nor by the position of the pin 33 which can assume its highest possible position because of the control slide 24. The control slide assumes the broken-line position and the drive wheels 13 and guide elements 16', 16" are in their normal engagement.

In the case of a failure the carriage 11 must be removed from the track and for this purpose, both sets of guide elements 16', 16" and drive wheels 13 must be lowered. This can be achieved by the hand-operated mechanism 28. In that case, the parts are brought into their position shown in dotted lines.

In this case, the mounting shaft 22 presses the control plate 31 several millimeters downwardly, sufficiently to release the balls 98 so that the load can be lifted off the carriage.

The mounting shaft 22 can then assume the dotted position shown in FIG. 1a and displaces the control plate 31 together with the slide 24 into the dotted positions to lower the wheels 13 and guide elements 16', 16". When the failure is effected during a period in which one of the guide elements is engaged e.g. the element 16', the lowering of the head plate 68 and slide 24 into its lowermost position, frees the drive wheel 13 and its guide element 16'.

For the aforedescribed operation of the carriage 11, the drive motor 12 and its servomotor 23 must be supplied with the requisite energy and required control commands.

For this purpose, the carriage has current-pickup shoes 40 which can be seen from FIG. 4b to be provided on horizontally swingable levers 101. The pickup shoes 40 are provided at locations depending upon the positions of the current-carrying rails 39 and are provided pairwise, one behind the other so that the respective swing levers 101 are correspondingly disposed pairwise parallel to one another and a spring 102 bridged between the paired levers (FIG. 4b) presses the shoes 40 away form one another to engage the respective rails. This provides a resiliently yieldable mounting of the shoes and allows compensation for the tolerances between the rails and the carriages for current pickup.

The rails 39 (FIG. 1) can be seen to be provided on the insulating profiles 38 disposed between the lower shanks 35' of the rails 35 and which extend along them and cover the rails 39 from above.

Three such profiles 38 are provided in the embodiment illustrated and are carried by connecting plates 46, the outermost profiles 38 being mechanically connected as well to the transverse shanks 35'.

The insulating profiles 38 are so formed that they provide current pickup slits 41 in which the shoes 40 and spacer pins 119 engage. The spacer pins 119 can be arranged in the carriage travel direction ahead of the shoes 40 and serve to clear the slits 41 from any component which can fall upon the insulating profiles and form contaminants which may collect and may interfere with effective electrical attack. The region in the vicinity of the connecting plate 46 is likewise cleared and contaminants and the like can fall freely from the slit 41.

Apart from the current supply rails 39 which have a cross section which must suit the energy-supply requirements and the smaller cross section data-supply conductors, ribbon conductors can be provided as represented at 47 with a plurality of branches 104. These serve as control conductors and can be used to make connections between work stations which are serviced by the carriages 11. Since the carriages 11 can be used to carry workpieces to be machined, the signal conductors 42 may interconnect these work stations or connect them to a central unit which can establish the sequence with which the stations are supplied, workpieces are picked up or connection established with the carriages.

The rails can be formed from rail segments which are butted against one another. In the abutment regions 45 (FIG. 7), the ends of the rails and the control conductors 42 must be connected together. This purpose can be served by the connecting plates 46 which, as shown in FIG. 1, can be provided with contact members 47 and 48 which connect to the rails or control conductors.

The contacts 47 can be ribs or blades set into the upper plate and mutually parallel to one another and which project vertically at their ends and pass through the insulation into engagement with the control conductors 42 via contact-making pins.

The terminals 48 can include vertically movable spring-loaded contact bars displaceable in recesses between the connecting plates and whose cross sections are determined by the cross sections of the current-supply rail with which they cooperate.

The connecting plates 46 are joined to the insulation profiles 38 by connecting screws 106 so that the insulation profiles 38 defining the slits 41 can be supported only by the connecting plates 46 or both by the connecting plates 46 and the rails with a minimum of intermediate supports.

The connecting plates 46 have fastening bores 108 at the fastening locations 107 which can be engaged by fastening elements, not shown, which, in turn, can engage in undercut-fastening grooves 44 on the underside of the lower shanks 35' of the C-section rail segments 35.

The rail segments 35 can have a multiplicity of such fastening grooves extending the entire lengths of the rail segments and provided on all of the outer surfaces 43. To these fastening grooves, other elements, devices or structures can be fastened. For example, additional supporting members for the track can be fastened in these grooves or the grooves can be used to fasten structures to be attached to the track. They may also be used to facilitate connection to track segments. To minimize loading of the track, it is advantageous to have the rail segments engage one another only at their butting joints and to have support posts 109 connected to them only at these joints (FIG. 6).

The rail segments should be so constructed that they can accommodate the track plan (FIG. 7) to any requirements. For example, the track plan shown in FIG. 7 utilizes straight rail segments 110, curved rail segments 111, left-branch segments 112 and right-branch segments 113. To the extent that the track does not lie exclusively in a single plane, upwardly-inclined and downwardly-inclined curved segments can be provided as well. The connecting location for the rail segments and their butt joints 45 have been shown by black dots in FIG. 7 with the segments and their control conductors and current-supply rails are electrically connected together. In the region of a current reversal 50, for example, such a connection is not made because in this region two rails of different potential would be brought together following the two left branches formed by the current-supply segment 114. In this case, the heavier line represents the rail segment which will carry the positive potential.

FIG. 7 also shows schematically regions 115 at which a drive-wheel engagement is possible or is necessary.

For example, along longitudinal stretches or arcuate stretches, for the most part only one of the two drive wheels need be engaged. In these regions, the rails are provided with guide parts 19 for the guide elements 16' and 16" and drive racks 20 for the drive wheels 13. In these regions, the unnecessary guide elements 19 and racks 20 can be omitted at a cost and energy saving.

Of course, in the region of branches 14, 14', depending upon the direction of movement the drive wheels 13 and guide elements 16, 16' will be selectively engageable with the respective segments 10' and 10" so that here a higher cost per unit length of track may be involved.

It is only in regions of current switching at 50 or drivewheel switchover at 49 that two longitudinally guiding rail segments 10' and 10" are required.

With respect to the current-rail switchover 50, it should be pointed out that in the region of the branches 14, there will be an interruption in the current-supply rail to allow the shoes 40 to cross over. To bridge these regions of interruption, each currentsupply shoe can be one of a pair 40', 40" connected in parallel to the terminals of the motors 12 and 23 so that the current is supplied to each terminal always in the same direction. Rectifiers may be connected in circuit with these terminals for this purpose.

Using the rail system shown in FIG. 7, the carriage can be displaced locomotively between any two work stations along respective branches. The load or workpiece transport is effected by connecting the workpiece to a respective workpiece carrier 290 using the pallet-workpiece-delivery technique.

At the work station, the workpiece carrier is unloaded and delivered intact to the machining location or the processing point of the station. It is, of course, possible to remove workpieces from the carrier, but travel to the workpieces with their respective carriers is preferred.

FIG. 1 shows that the carrier 29 may be displaced laterally onto skids or guides 116 which may be positioned to lift the carrier 29 from the carriage as the carrier is transported to the right from the track.

This type of pallet transfer of workpieces with fixed positions on the workpiece carriers 29 has the advantage that the positioning of the workpieces in machine tools or the like can be made rapidly by simply locking the carrier in a position at the machine tool.

A sensor 120 is provided to ensure that the carrier 29 is properly positioned on the carriage before actuation of the lock 30. The sensor 120 can be a proximity switch or the like.

The control of the motors 12 and 23 and of the actuating device 30 can be effected in response to data collected at a central location and in a conventional manner. In the drawing we have shown only schematically the connecting lines 117 for the motors 12 and 23. In FIG. 4 a vertical passage of the current line 118 has been shown to enable current to be supplied to the workpiece carrier and to the machine tools at the work stations themselves.

The invention can be modified in many respects within the spirit and scope of the appended claims and all of these modifications are likewise considered to be part of the present invention.

We claim:

1. A transport system for workpieces, comprising:
a track defined by rails and including first rigid longitudinally extending rail segments continuing along an original path at a branch in said track and second rigid longitudinally extending rail segments diverging from said first segments at said branch; and
a workpiece-carrying carriage mounted on said rails and displaceable along said track and comprising:
drive wheels on said carriage form-fittingly engaging said rails and propelling said carriage along said track,
a remotely controlled motor mounted on said carriage and operatively connected to said drive wheels for rotating same to propel said carriage along said track,
at least one guide element on said carriage shiftable in position selectively to engage and clear said first and second rigid rail segments, and
actuating means on said carriage for shifting said guide element to engage selectively in one of said rail segments and cause said carriage to continue along said path or to divert to said branch, two of said guide elements being provided on opposite sides of said carriage and are positioned for selective engagement in the respective rail segments, said actuating means including means for alternatively shifting said guide elements into engagement with the respective rail segment, a respective one of said drive wheels being disposed opposite one another on said opposite sides of said carriage, each of said drive wheels passing into engagement with a respective one of said rail segments corresponding to the guide element engaging same, said carriage having a generally rectangular plan configuration and is provided with two of said running rollers spaced apart along each of said sides, a pair of said guide elements spaced apart along each side with each guide element being located in a vicinity of a respective running roller, a respective one of said drive wheels being located between the guide elements of each pair on the respective side of the carriage, each of said drive elements being shiftable transversely to said direction relative to the carriage, said carriage further comprising:
a common drive shaft on said carriage operatively connected to both said drive wheels and driven by said motor,
means including a displacement shaft for mounting said motor and said drive shaft for displacement on said carriage to shift said drive wheels relative to said rails, and
a servomotor on said carriage operatively connected to said displacement shaft for displacing same, said guide elements being coupled with the respective drive wheel for displacement with said motor and said common drive shaft, said carriage further comprising means between said servomotor and said displacement shaft for selectively in respective positions of said servomotor:
(a) shifting both pairs of guide elements and the respective drive wheels into engagement simultaneously with rail segments on opposite sides of said carriage;
(b) shifting one of said pairs of guide elements and the respective drive wheel into engagement with one of said first and second rail segments while holding the other of said pairs of guide elements and the respective drive wheel out of engagement with the other of said first and second rail segments;
(c) shifting the other of said pairs of guide elements and the respective drive wheel into engagement with said one of said first and second rail segments while holding said one of said pairs of guide elements and the respective drive wheel out of engagement with said one of said first and second rail segments; and
(d) shifting both of said pairs of guide elements and said drive wheels out of engagement with said rail segments.

2. The transport system defined in claim 1 wherein said rails have support portions and said carriage is supported on said rails by a plurality of running rollers journaled on said carriage and riding upon said support portions, said running rollers having axes transverse to a direction of displacement of said carriage on said track, said rails further having guide portions extending in said direction and said guide elements and drive wheels being spaced apart and vertically shiftable on said carriage selectively into engagement with said guide portions.

3. A transport system for workpieces, comprising:
a track defined by rails and including first rigid longitudinally extending rail segments continuing along an original path at a branch in said track and second rigid longitudinally extending rail segments diverging from said first segments at said branch; and
a workpiece-carrying carriage mounted on said rails and displaceable along said track and comprising:
drive wheels on said carriage form-fittingly engaging said rails and propelling said carriage along said track,
a remotely controlled motor mounted on said carriage and operatively connected to said drive wheels for rotating same to propel said carriage along said track,
at least one guide element on said carriage shiftable in position selectively to engage and clear said first and second rigid rail segments, and
actuating means on said carriage for shifting said guide element to engage selectively in one of said rail segments and cause said carriage to continue along said path or to divert to said branch, two of said guide elements being provided on opposite sides of said carriage and being positioned for selective engagement in the respective rail segments, said actuating means including means for alternatively shifting said guide elements into engagement with the respective rail segment, a respective one of said drive wheels being disposed opposite one another on said opposite sides of said carriage, each of said drive wheels passing into engagement with a respective one of said rail segments corresponding to the guide element engaging same, said rails having support portions and said carriage being supported on said rails by a plurality of running rollers journaled on said carriage and riding upon said support portions, said running rollers having axes transverse to a direction of displacement of said carriage on said track, said rails further having guide portions extending in said direction and said guide elements and drive wheels being spaced apart and vertically shiftable on said carriage selectively into engagement with said guide portions, said carriage having a generally rectangular plan configuration and being provided with two of said running rollers spaced apart along each of said sides, a pair of said guide elements spaced apart along each side with each guide element being located in a vicinity of a respective running roller, a respective one of said drive wheels being located between the guide elements of each pair on the respective side of the carriage, each of said drive elements being shiftable transversely to said direction relative to the carriage, said transport system further comprising:
a common drive shaft on said carriage operatively connected to both said drive wheels and driven by said motor,
means including a displacement shaft for mounting said motor and said drive shaft for displacement on said carriage to shift said drive wheels relative to said rails, and a servomotor on said carriage operatively connected to said displacement shaft for displacing same, said guide elements being coupled with the respective drive wheel for displacement with said motor and said common drive shaft, said carriage further comprising cam means between said servomotor and said displacement shaft for selectively in respective positions of said servomotor:
(a) shifting both pairs of guide elements and the respective drive wheels into engagement simultaneously with rail segments on opposite sides of said carriage;
(b) shifting one of said pairs of guide elements and the respective drive wheel into engagement with one of said first and second rail segments while holding the other of said pairs of guide elements and the respective drive wheel out of engagement with the other of said first and second rail segments;
(c) shifting the other of said pairs of guide elements and the respective drive wheel into engagement with said one of said first and second rail segments while holding said one of said pairs of guide elements and the respective drive wheel out of engagement with said one of said first and second rail segments; and
(d) shifting both of said pairs of guide elements and said drive wheels out of engagement with said rail segments.

4. A transport system for workpieces, comprising:
a track defined by rails and including first rigid longitudinally extending rail segments continuing along an original path at a branch in said track and second rigid longitudinally extending rail segments diverging from said first segments at said branch; and
a workpiece-carrying carriage mounted on said rails and displaceable along said track and comprising:
drive wheels on said carriage form-fittingly engaging said rails and propelling said carriage along said track,
a remotely controlled motor mounted on said carriage and operatively connected to said drive wheels for rotating same to propel said carriage along said track,
at least one guide element on said carriage shiftable in position selectively to engage and clear said first and second rigid rail segments, and
actuating means on said carriage for shifting said guide element to engage selectively in one of said rail segments and cause said carriage to continue along said path or to divert to said branch, two of said guide elements being provided on opposite sides of said carriage and being positioned for selective engagement in the respective rail segments, said actuating means including means for alternatively shifting said guide elements into engagement with the respective rail segment, a respective one of said drive wheels being disposed opposite one another on said opposite sides of said carriage, each of said drive wheels passing into engagement with a respective one of said rail segments corresponding to the guide element engaging same, said rails having support portions and said carriage being supported on said rails by a plurality of running rollers journaled on said carriage and riding upon said support portions, said running rollers having axes transverse to a direction of displacement of said carriage on said track, said rails further having guide portions extending in said direction and said guide elements and drive wheels being spaced apart and vertically shiftable on said carriage selectively into engagement with said guide portions, said carriage having a generally rectangular plan configuration and being provided with two of said running rollers spaced apart along each of said sides, a pair of said guide elements spaced apart along each side with each guide element being located in a vicinity of a respective running roller, a respective one of said drive wheels being located between the guide elements of each pair on the respective side of the carriage, each of said drive elements being shiftable transversely to said direction relative to the carriage, said transport system further comprising:

a common drive shaft on said carriage operatively connected to both said drive wheels and driven by said motor, means including a displacement shaft for mounting said motor and said drive shaft for displacement on said carriage to shift said drive wheels relative to said rails, and a servomotor on said carriage operatively connected to said displacement shaft for displacing same, said displacement shaft being mounted on said carriage on two spring-biased rockers carried by a rocker shaft mounted for angular displacement on said carriage parallel to said displacement shaft.

5. The transport system defined in claim 4, further comprising a manually operated positioning device acting upon said displacement shaft for shifting both of said pairs of guide elements and said drive wheels out of engagement with said rail segments.

6. A transport system for workpieces, comprising:

a track defined by rails and including first rigid longitudinally extending rail segments continuing along an original path at a branch in said track and second rigid longitudinally extending rail segments diverging from said first segments at said branch; and a workpiece-carrying carriage mounted on said rails and displaceable along said track and comprising:

drive wheels on said carriage form-fittingly engaging said rails and propelling said carriage along said track, a remotely controlled motor mounted on said carriage and operatively connected to said drive wheels for rotating same to propel said carriage along said track, at least one guide element on said carriage shiftable in position selectively to engage and clear said first and second rigid rail segments, and actuating means on said carriage for shifting said guide element to engage selectively in one of said rail segments and cause said carriage to continue along said path or to divert to said branch, two of said guide elements being provided on opposite sides of said carriage and being positioned for selective engagement in the respective rail segments, said actuating means including means for alternatively shifting said guide elements into engagement with the respective rail segment, a respective one of said drive wheels being disposed opposite one another on said opposite sides of said carriage, each of said drive wheels passing into engagement with a respective one of said rail segments corresponding to the guide element engaging same, said rails having support portions and said carriage being supported on said rails by a plurality of running rollers journaled on said carriage and riding upon said support portions, said running rollers having axes transverse to a direction of displacement of said carriage on said track, said rails further having guide portions extending in said direction and said guide elements and drive wheels being spaced apart and vertically shiftable on said carriage selectively into engagement with said guide portions, said carriage having a generally rectangular plan configuration and being provided with two of said running rollers spaced apart along each of said sides, a pair of said guide elements spaced apart along each side with each guide element being located in a vicinity of a respective running roller, a respective one of said drive wheels being located between the guide elements of each pair on the respective side of the carriage, each of said drive elements being shiftable transversely to said direction relative to the carriage, said transport system further comprising:

a common drive shaft on said carriage operatively connected to both said drive wheels and driven by said motor, means including a displacement shaft for mounting said motor and said drive shaft for displacement on said carriage to shift said drive wheels relative to said rails, and a servomotor on said carriage operatively connected to said displacement shaft for displacing same, a replaceable workpiece carrier being provided on said carriage, and locking means operable by said servomotor for selectively locking said carrier on said carriage and releasing said carrier.

7. The transport system defined in claim 6 wherein said servomotor drives a control plate and said locking means includes a locking mechanism engaging said carrier, and a control lever displaceable by said control plate and acting upon said mechanism.

8. The transport system defined in claim 7 wherein an eccentric for the control plate is rigidly connected to a slide pin of a control slide for shifting said motor.

9. The transport system defined in claim 1, further comprising bumpers at opposite ends of said carriage in a direction of displacement thereof, enabling spring-stressing displacement of said carriage upon engagement of an obstruction by one of said bumpers, and switching said motor when said spring-stressing displacement exceeds a predetermined limit.

10. The transport system defined in claim 1 wherein said drive wheels on said carriage form-fittingly engage said rails at downwardly turned toothed strips meshing with corresponding teeth on said drive wheels.

11. The transport system defined in claim 1 wherein said rail segments comprise C-section members open toward one another and having lower legs along which said running rollers ride, and upper legs formed with vertical guide ribs, said guide elements being rollers rotatable about vertical axes and being laterally engageable by said guide ribs, said upper legs having, formations form-fittingly engaged by said drive wheels.

12. The transport system defined in claim 11, further comprising electrically insulating strips received between said lower legs and formed with electric-current-supply rails in sliding contact with current pickup shoes on said carriage.

13. The transport system defined in claim 12 wherein said strips are continuous and smooth on their sides facing said carriage and provide a throughgoing slot affording access of said pickup shoes therethrough to said electric-current-supply rails.

14. The transport system defined in claim 12 wherein said strips are formed with control conductors running parallel to said electric-current supply rails.

15. The transport system defined in claim 12 wherein said rigid rails are formed at sides turned away from said carriage with continuously extending undercut fastening grooves.

16. A transport system for workpieces, comprising:
a track defined by rails and including first rigid longitudinally extending rail segments continuing along an original path at a branch in said track and second rigid longitudinally extending rail segments diverging from said first segments at said branch; and
a workpiece-carrying carriage mounted on said rails and displaceable along said track and comprising:
drive wheels on said carriage form-fittingly engaging said rails and propelling said carriage along said track,
a remotely controlled motor mounted on said carriage and operatively connected to said drive wheels for rotating same to propel said carriage along said track,
at least one guide element on said carriage shiftable in position selectively to engage and clear said first and second rigid rail segments, and
actuating means on said carriage for shifting said guide element to engage selectively in one of said rail segments and cause said carriage to continue along said path or to divert to said branch, two of said guide elements being provided on opposite sides of said carriage and being positioned for selective engagement in the respective rail segments, said actuating means including means for alternatively shifting said guide elements into engagement with the respective rail segment, a respective one of said drive wheels being disposed opposite one another on said opposite sides of said carriage, each of said drive wheels passing into engagement with a respective one of said rail segments corresponding to the guide element engaging same, said rails having support portions and said carriage being supported on said rails by a plurality of running rollers journaled on said carriage and riding upon said support portions, said running rollers having axes transverse to a direction of displacement of said carriage on said track, said rails further having guide portions extending in said direction and said guide elements and drive wheels being spaced apart and vertically shiftable on said carriage selectively into engagement with said guide portions, said carriage having a generally rectangular plan configuration and being provided with two of said running rollers spaced apart along each of said sides, a pair of said guide elements spaced apart along each side with each guide element being located in a vicinity of a respective running roller, a respective one of said drive wheels being located between the guide elements of each pair on the respective side of the carriage, each of said drive elements being shiftable transversely to said direction relative to the carriage, said transport system further comprising:
a common drive shaft on said carriage operatively connected to both said drive wheels and driven by said motor,
means including a displacement shaft for mounting said motor and said drive shaft for displacement on said carriage to shift said drive wheels relative to said rails, and
a servomotor on said carriage operatively connected to said displacement shaft for displacing same, said rail segments comprising C-section members open toward one another and having lower legs along which said running rollers ride, and upper legs formed with vertical guide ribs, said guide elements being rollers rotatable about vertical axes and being laterally engageable by said guide ribs, said upper legs having formations form-fittingly engaged by said drive wheels, electrically insulating strips being received between said lower legs and formed with electric-current-supply rails in sliding contact with current pickup shoes on said carriage, said strips being formed with control conductors running parallel to said electric-current supply rails, fastening plates being secured to an underside of said lower legs via respective fastening grooves thereof and provided with means for effecting electrical connection with said control conductors and said supply rails.

17. The transport system defined in claim 14 wherein the upper legs of said C-section rails are provided along both of said C-section rails, only along said track where one of said C-section rails extends in each of the directions of said branch.

18. The transport system defined in claim 14 wherein for each supply rail two pickup shoes are provided and are spaced apart to bridge interruptions in continuity of the supply rails at the branch and are connected in parallel to said motor.

* * * * *